Figure 1:
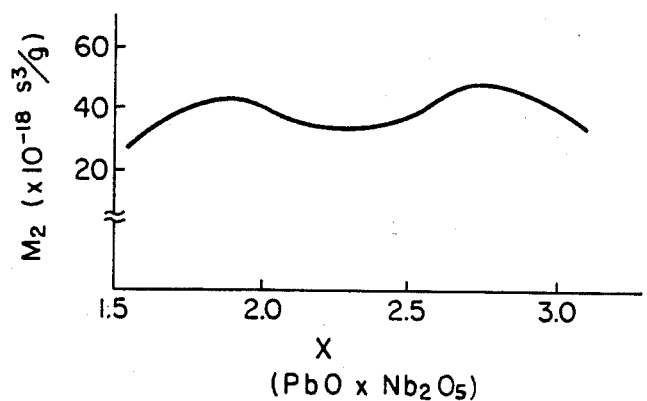

United States Patent [19]

Kondo et al.

[11] 4,094,583

[45] June 13, 1978

[54] ACOUSTOOPTIC DEVICE

[75] Inventors: Yojiro Kondo; Yoshinori Ohta, both of Tokyo, Japan

[73] Assignee: Nippon Electric Co., Ltd., Tokyo, Japan

[21] Appl. No.: 701,024

[22] Filed: Jun. 30, 1976

[30] Foreign Application Priority Data

Dec. 11, 1975 Japan .................................. 50-147982
Jul. 4, 1975 Japan .................................. 50-82480

[51] Int. Cl.² .............................................. G02F 1/28
[52] U.S. Cl. ................................................... 350/358
[58] Field of Search ............ 350/161 W; 359/96 WG; 331/94.5 M

[56] References Cited

U.S. PATENT DOCUMENTS

| 3,617,931 | 11/1971 | Pinnow et al. | 350/161 W |
| 3,851,951 | 12/1974 | Eveleth | 350/161 W |
| 3,906,393 | 9/1975 | Fletcher | 350/161 W |

Primary Examiner—William L. Sikes
Attorney, Agent, or Firm—Hopgood, Calimafde, Kalil, Blaustein and Lieberman

[57] ABSTRACT

An acoustooptic device using a single crystal as its acoustooptic medium consisting essentially of lead monoxide (PbO) and niobium pentoxide ($Nb_2O_5$) in the composition ratio $x$ by mol as $1.5 \leq x \leq 3.1$ for $PbO \cdot x\ Nb_2O_5$.

12 Claims, 7 Drawing Figures

ACOUSTOOPTIC DEVICE

The present invention relates to devices for controlling a light beam, in time and space, according to an electrical signal applied. The invention relates more particularly to acoustooptic devices using sound-light interaction phenomena.

STATE OF THE ART

Recently there has been a growing interest in data processing systems and data transmission systems which utilize light waves; the use of light waves makes them operable at a greater speed and serves to increase their transmission densities and data handling capacities. These systems often use devices capable of controlling a light beam at high speed, in time and space, according to an electrical signal applied. In this art, crystal, ceramic and glass are typical of device materials utilizing their electrooptic or acoustooptic properties. Of the two types, acoustooptic devices are more often used because they are small in size, inexpensive, and simple in optical adjustment.

It is well-known that a high frequency sound wave produced in a solid or a liquid serve as a phase grating for a light wave, causing an incident light beam to be diffracted. The acoustooptic device is one operated on this principle for controlling a light beam, or one used for light deflection, modulation, wavelength selection or mode conversion under the control of a sound wave. An acoustooptic device has one or more of acoustooptic functions typically including the function in which an incident light beam is diffracted by a high frequency sound wave produced in an acoustooptic medium and thus the diffraction angle of the light beam is changed to an amount corresponding to the change in the wavelength of the sound wave; the function of changing the wavelength of a light beam diffracted at a given angle by the use of a high frequency sound wave; the function of converting a diffracted light beam into a light beam different from the incident light beam in propagation mode under the control of a high frequency sound wave; and the function of changing the intensity of a diffracted light beam by changing the amplitude of a high frequency sound wave produced.

Acoustooptic devices having these functions are called ultrasonic light deflector; acoustooptic filter; acoustic light mode filter; and ultrasonic light modulator, respectively. A typical acoustooptic device using a volume travelling sound wave employs a crystal, ceramic, glass or the like material as its acoustooptic medium having an electro-acoustic transducer on one side, and an acoustic absorber on the opposite side, the two other sides approximately normal to the acoustic sides being the light input and output ends respectively. This device is operated in such manner that an electrical output from a high frequency oscillator is supplied to the electro-acoustic transducer to produce a high frequency sound wave in the medium, and a light wave introduced into the medium through its input end is diffracted by the sound wave produced.

In any light control device, the intensity of its output light is supposed to be high, that is, the insertion loss on the light controlled must be small enough. This is an important consideration taken in evaluating the quality of a light control device. In the same sense, in an acoustooptic device, the ratio of the diffracted light intensity to the input light intensity, i.e., the diffraction efficiency, is supposed to be high, or an acoustooptic device is supposed to be operable with a high diffraction efficiency by the use of a small amount of energy from a sound wave which is an element active on a light beam applied.

The Bragg diffraction (or Bragg reflection) is known, which is an effect whereby a light beam is diffracted by an acoustic field whose active length is sufficiently longer than the wavelength of the light beam. More specifically, Eq. (1) below approximately gives the ratio of the diffracted light to the input light, i.e., the diffraction efficiency, in a small region, under the condition that a phase matching is reached between the wave vector of the input light and diffracted light and the wave vector of the sound wave, or that a light beam is applied at a Bragg angle with the sound wave.

$$I_1/I_0 = \pi^2/(\lambda^2 \cos^2\theta_0) \cdot M_2 L/(2H) \cdot P_a \quad (1)$$

where $\theta_0$ : Bragg angle
$\lambda$: Wavelength in a vacuum
$P_a$: acoustic power
L: length of an electro-acoustic transducer in the direction of light propagation, which generates a sound wave in the acoustooptic medium
H: width of the electro-acoustic transducer in the direction perpendicular to L Thus L·H gives the area of the transducer. The value $M_2$ is defined as $M_2 = p^2 n^6/(\rho v^3)$, where $p$, $n$, $\rho$, and $v$ denote the photo-elasticity constant, refractive index, density and sound velocity, respectively, of an acoustooptic medium. The value $M_2$ is called the acoustooptic figure of merit of an acoustooptic medium and depends solely upon material constants of an acoustooptic medium. As in Eq. (1), the diffraction efficiency per unit acoustic power depends on values inherent in the materials of an acoustooptic medium used, when the design values of L and H which represent the dimensions of an electrooptic transduer used are constant. In other words, the use of an acoustooptic medium of high acoustooptic figure of merit $M_2$ will lead to the obtainment of a highly efficient acoustooptic device. The figure of merit $M_2$ is concerned also in the stability and reliability of an acoustooptic device as will be described later.

Prior art techniques have provided various acoustooptic devices in which an optical glass or crystal having a high figure of merit $M_2$ is used as the acoustooptic medium. The prior art acoustooptic devices, however, have several drawbacks to be eliminated. One problem, for example, lies in the use of a glass material such as high density lead glass having a high figure of merit $M_2$ because this material causes great acoustic loss and hence is not suited for use in a high frequency range. While crystal materials cause far less acoustic loss than glass materials and hence are widely used as acoustooptic media. Among crystals, $LiTaO_3$ and $LiNbO_3$, for example, are ones whose figures of merit are too small although their acoustic losses are very small. Semiconductor crystals such as Ge and GaAs crystals have high figures of merit in the region of light wavelengths longer than 1 micron but allow no visible light to pass. While $PbMoO_4$ and $TeO_2$ crystals are materials whose acoustic losses are relatively small and figures of merit are relatively large; some of them have been put to practical use although their figures of merit are not high enough. To compensate for the figure of merit and obtain a high diffraction efficiency, a relatively large power must be applied to an electro-acoustic transducer used for the crystal acoustooptic device. This results in an increased power loss in terms of heat produced electrically and acoustically in the electrodes and bonding medium of the electro-acoustic transducer. The produced heat brings about a disuniform temperature distribution in the acoustooptic medium, and the resultant temperature gradient affects the refractive index and the sound velocity in the medium, causing the output light beam to be deformed and/or angularly displaced. This has made it difficult to maintain high operating stability and reliability in this type of acoustooptic device.

As described above, an acoustooptic device is one capable of generating a sound wave in its acoustooptic medium through which a light beam is transmitted. Generally, materials whose acoustooptic figures of merit are relatively high are unable or nearly unable to generate a sound wave. This is why an electro-acoustic transducer has had to be installed on one surface of the acoustooptic medium. A piezoelectric transducer is commonly used for such electro-acoustic transducer, which is bonded to the acoustooptic medium by an organic (e.g., epoxy resin) bonding agent or by a low-melting point metal such as indium. Although the thickness of the bonding layer is very thin, i.e., 0.5 to 2 microns, heat produced in the bonding layer is not negligible because the bonding medium has a relatively high acoustic absorption coefficient and the frequency of a sound wave generated by the piezoelectric transducer is as high as several tens to several hundred megahertz. Accordingly, high operating stability can hardly be maintained for the device. Furthermore, the acoustic impedance, among other acoustic characteristics, of the bonding medium is lower than those of the piezoelectric transducer and the acoustooptic medium. This has limited efficient generation of a sound wave over a wide band. In other words, the conventional device construction associating an electro-acoustic transducer bonded to the acoustooptic medium reduces the efficiency of the device. This problem can be solved by the use of an acoustooptic medium which has a high piezoelectric conversion efficiency, in addition to a high acoustooptic figure of merit. Without having an electro-acoustic transducer, this type of acoustooptic device is simple in construction, except for electric field applying electrodes installed on the acoustooptic medium. Thus this acoustooptic device can operate efficiently with high stability and reliability.

OBJECTS OF THE INVENTION

An object of the present invention is to provide an acoustooptic device operable with high efficiency and stability.

Another object of the invention is to provide a constructionally simple acoustooptic device manufacturable in a minimum number of work steps.

With these and other objects in view, the present invention provides an acoustooptic device using a single crystal as its acoustooptic medium, the crystal being sliced along a suitable direction and composed essentially of lead monoxide (PbO) and niobium pentoxide ($Nb_2O_5$) in the composition ratio x by mol as $$1.5 \leq x \leq 3.1 \text{ for } PbO \cdot xNb_2O_5.$$

Figure 2:
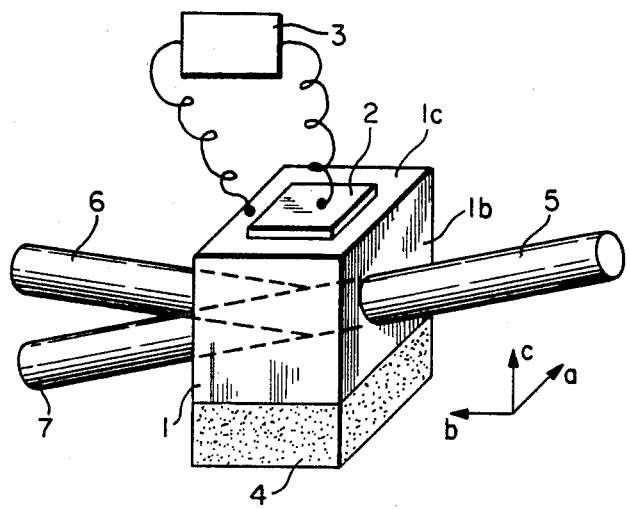
Figure 3:
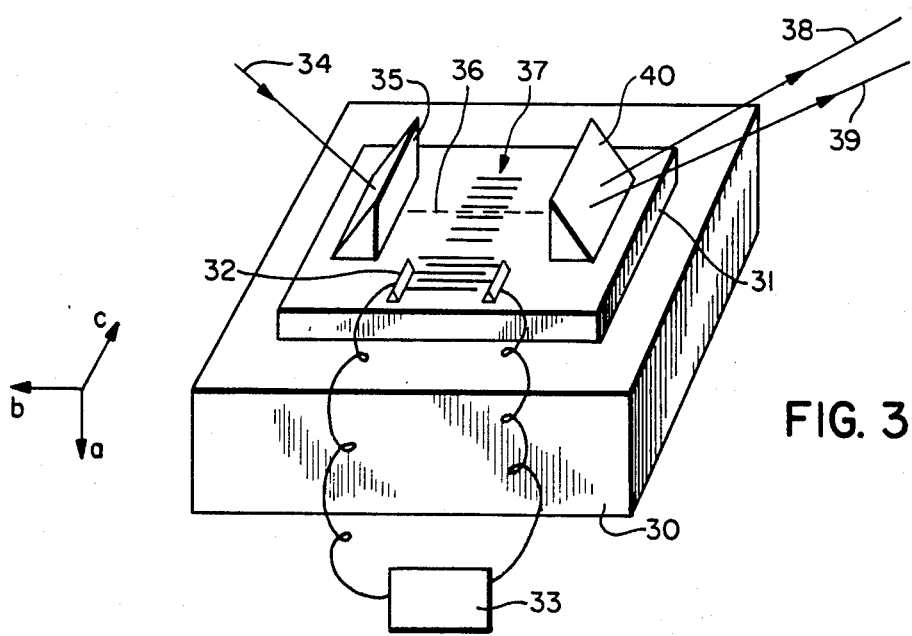
Figure 6:
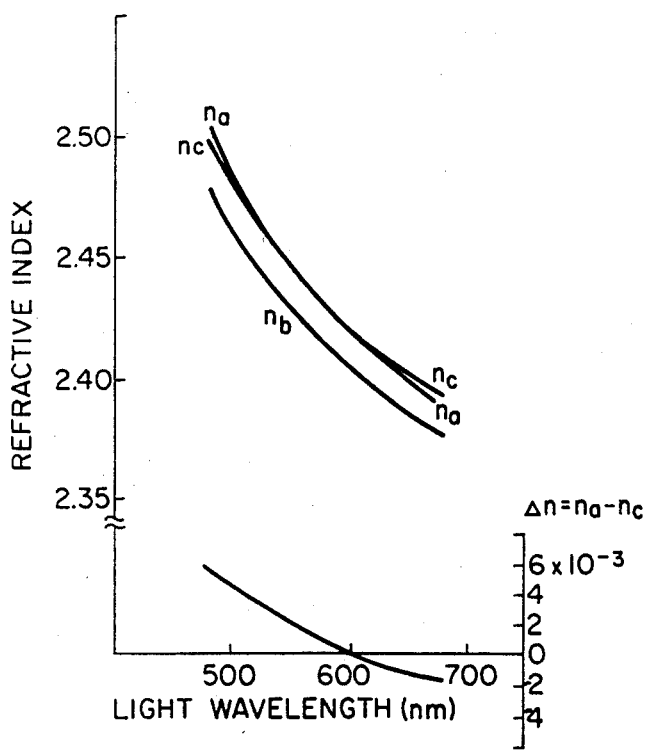
Figure 4:
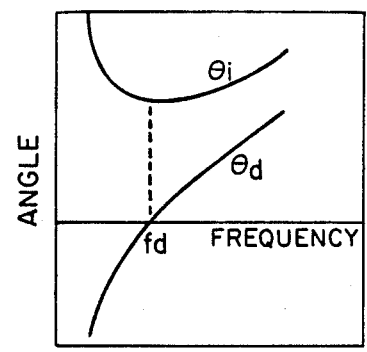
Figure 7:
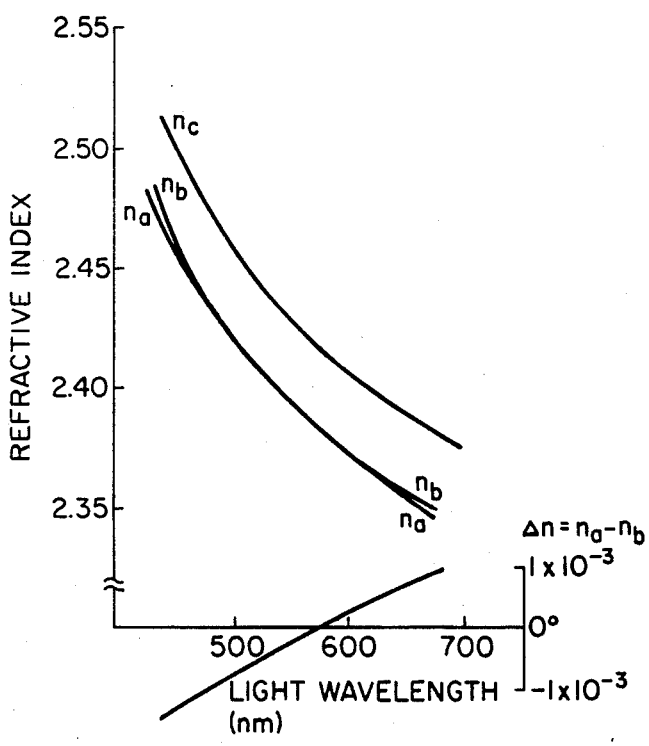
Figure 5:
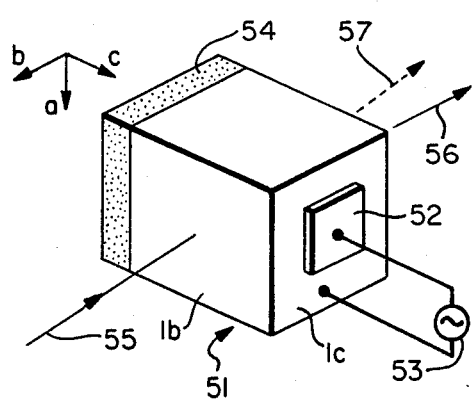

Further objects, features and advantages of the present invention will become apparent from the following detailed description taken in conjunction with the accompanying drawings, wherein:

FIG. 1 is a graphic diagram showing the relation between the composition ratio x of crystal $PbO \cdot xNb_2O_5$ used for the purpose of the invention and the maximum value of its acoustooptic figure of merit $M_2$, FIG. 2 is a perspective view of a ultrasonic light deflector of a first embodiment of the invention, FIG. 3 is a perspective view of a surface wave light deflector of a second embodiment of the invention, FIG. 4 is a graphic diagram qualitatively showing one of frequency vs. input and output light beam angle characteristics in anisotropic Bragg diffraction phenomenon, FIG. 5 is a perspective view of a ultrasonic light deflector using an anisotropy Bragg diffraction phenomenon according to a third embodiment of the invention, FIG. 6 is a graphic diagram showing dispersion characteristics of refractive indexes vs. light wavelengths in $PbO \cdot 1.9Nb_2O_5$ crystal of the third embodiment, and FIG. 7 is a graphic diagram showing dispersion characteristics of refractive indexes vs. light wavelengths in $PbO \cdot 2.1Nb_2O_5$ crystal.

STATEMENT OF THE INVENTION

The present invention is characterized in particular by its use of a novel acoustooptic medium, i.e., a ferroelectric crystal $PbO \cdot xNb_2O_5$ in the mol ratio $1.5 \leq x \leq 3.1$, which has been realized in an ideal single crystal by the inventors of the present invention. The growth and crystallo-graphic study on such single crystal are described in Journal of Crystal Growth Vol. 24/25 (1974), p. 445 and Vol. 26 (1974), p. 319. Crystals of this type are divided into two groups by compositional ranges: $1.5 \leq x < 2.1$ and $2.1 \leq x \leq 3.1$, having different crystal lattice constants. Crystals belonging to each group, or so-called solid solutions, have similar lattice constants even among those whose compositions differ from each other. These crystals have desirable acoustooptic characteristics. Acoustooptic figures of merit measured of $PbO \cdot 2.7Nb_2O_5$ crystal are shown below in comparison with those of $PbMoO_4$ and $TeO_2$ crystals which are best prior art acoustooptic crystals. (Note: In the tables below, the crystal axes a, b and c are in the directions of lattice constants: $a = 12.5A$, $b = 37.2A$ and $c = 4.0A$, as stated in the foregoing Journal of Crystal Growth, in crystals with compositions in the range: $2.1 \leq x \leq 3.1$.)

| Crystalline Material | $PbO \cdot 2.7Nb_2O_5$ | | | | | | | | $PbMoO_4$ | $TeO_2$ |
|---|---|---|---|---|---|---|---|---|---|---|
| Sound Wave Propagation Directions | axis a | | | axis b | | | axis c | | axis c | axis c |
| Sound Velocities (m/s) | 5520 | | | 5750 | | | 5330 | | 3630 | 4200 |
| Polarization Directions (Linear Polar.) | a | b | c | a | b | c | a | b | c | c⊥ |
| Accoustooptic Figures of Merit $M_2 (10^{-18} s^3/g)$ | 4.9 | 0.59 | — | 1.8 | 1.2 | — | 3.9 | 3.4 | 48 | 36 | 34 |

The acoustooptic figure of merit of PbO·2.5Nb$_2$O$_5$ is as good as that of PbO·2.7Nb$_2$O$_5$; it is as high as 35 × 10$^{-18}$s$^3$/g when the longitudinal sound wave is propagated along the axis c, and a linearly polarized light beam oscillated in the direction of axis c is transmitted along the axis b. The crystals belonging to the other group also exhibit excellent acoustooptic properties. For example, the PbO·1.9Nb$_2$O$_5$ crystal has as high acoustooptic figure of merit as 45 × 10$^{-18}$s$^3$/g. The maximum values of acoustooptic figures of merit M$_2$ of the PbO·xNb$_2$O$_5$ crystals of the invention are plotted in FIG. 1 for the compositional ratio x. As shown in FIG. 1, their acoustooptic figures of merit are high in any compositional ratio.

FIG. 2 is a perspective view of a device of a first embodiment of the invention using a PbO·xNb$_2$O$_5$ (where x is 2.7 in this example), illustrating principles of a ultrasonic light deflector using a plane longitudinal sound wave. A deflection medium 1 is of PbO·2.7Nb$_2$O$_5$ crystal polished into a parallelepiped along crystal axes a, b and c. A piezoelectric transducer 2 is bonded to a plane c (indicated by the reference 1c) of the deflection medium 1. A longitudinal sound wave is generated in the medium 1 by applying across the piezoelectric transducer 2 a high frequency field from a high frequency generator 3. The piezoelectric transducer 2 is of such a crystal plate as LiNbO$_3$ 36°-rotation Y-cut plate or Ba$_2$NaNb$_5$O$_{15}$ Z-cut plate.

An acoustic absorber 4 is installed on the plane opposite to the plane 1c so that the sound wave generated in the deflection medium 1 becomes a travelling wave. A light beam 5 is applied to a plane b (indicated by the reference 1b) of the PbO·2.7Nb$_2$O$_5$ crystal, i.e., the deflection medium 1. The deflection plane is for linear polarization in the direction along the axis c. The light beam 5 is diffracted by the sound wave in the deflection medium 1, into a diffracted output light beam 6 and a nondiffracted output light beam 7.

As described above, the acoustooptic figure of merit M$_2$ of the medium of the invention is 48 × 10$^{18}$s$^3$/g which is greater than those (36 × 10$^{-18}$s$^3$/g and 34 × 10$^{18}$s$^3$/g) of PbMoO$_4$ and TeO$_2$ crystals. Thus, when the piezoelectric transducer 2 is 10 mm long and 2 mm wide, the acoustic power required to obtain 100% diffraction efficiency is only 0.78 watt in the PbO·2.7Nb$_2$O$_5$ medium, as opposed to 1.13 watts in the TeO$_2$ medium and 1.1 watts in the PbMoO$_4$ medium. Furthermore, the sound velocity is higher in the crystal of the invention than in the other two and hence the deflection speed is higher in the former than in the latter. In this embodiment, a light beam is transmitted along the axis b in the medium. A light beam may be transmitted along the axis a instead of the axis b.

The PbO·xNb$_2$O$_5$ crystal is a ferroelectric and exhibits desirable piezoelectric properties by poling process. In other words, this crystal is potentially capable of elastic wave oscillation without depending on a piezoelectric transducer. For example, an elastic surface wave can be efficiently generated in the crystal by applying a high frequency field to an interdigital electrode which is installed on a suitable plane and in a suitable direction of the crystal by vapor deposition techniques.

Referring to FIG. 3, there is shown a perspective view of a surface wave light deflector of a second embodiment of the invention using a poled ferroelectric PbO·xNb$_2$O$_5$ crystal (where x is 1.9 in this example). A PbO·1.9Nb$_2$O$_5$ crystal plate 31 is installed on a glass substrate 30. An interdigital electrode 32 is installed on a surface of the crystal 31 by vapor deposition techniques so that an elastic surface wave is propagated along the direction of axis c of the crystal a plate. A high frequency oscillator 33 capable of generating a high frequency signal is connected to the electrode 32. An input light beam 34 is introduced into the crystal 31 through an incident beam prism coupler 35 and propagated as a guided beam 36 along the axis b in the crystal 31. The guided beam 36 is diffracted by an elastic surface wave 37 generated by the electrode 32 and then is emitted as a diffracted output beam 38 and a nondiffracted output beam 39 through an output beam prism coupler 40. As a light wave guide, the crystal 31 is about 15 microns in thickness. To obtain this thickness, one surface of the crystal is polished, the crystal is bonded to the glass substrate 30 with its polished surface in contact with the substrate surface, and then the other surface of the crystal is polished. The mechano-chemical polishing method is known as one which least introduces strain into the crystal 31. Needless to say, the refractive index of the glass substrate 30 is selected to be smaller than that of the crystal 31. The glass substrate can be substituted by a metal substrate. The electromechanical coupling coefficient k$_{33}$ of the PbO·1.9Nb$_2$O$_5$ crystal is 0.3 being larger than that available with a typical piezoelectric crystal, ie., quartz, with the result that an elastic surface wave is efficiently generated in the crystal of the invention. This advantage, in addition to the foregoing high acoustooptic figure of merit of the crystal of the invention, makes it possible to realize a highly efficient surface wave light deflector eliminating a piezoelectric transducer as in the second embodiment. In this example, a PbO·1.9Nb$_2$O$_5$ crystal a plate is employed for the sake of illustration. Instead, a crystal plate of other orientation may be used with different electrode arrangement if necessary.

An ultrasonic light deflector using an anisotropic Bragg diffraction phenomenon will hereinafter be described as a third embodiment of the invention. One of the indexes which determine the performance quality of a ultrasonic light deflector is the deflection point number N, which is given as $$N = 1/\gamma \cdot D/v \, \Delta f \qquad (2)$$

where $\Delta f$ denotes a frequency bandwidth of a deflector element used, which is normally defined as a frequency range in which the deflected light intensity is within half its maximum value; v denotes a sound velocity; D the diameter of an input light beam to the deflector; and $\gamma$ a factor depending upon the light beam intensity distribution and shape, being 1.27 for a Gaussian beam or 1.0 for a rectangular beam. The deflection point number is proportional to the diameter D of a light beam applied and the frequency bandwidth $\Delta f$. The deflection point number can be increased by increasing the diameter D and the frequency bandwidth $\Delta f$. In practice, increasing the beam diameter D will result in an increased time ($\tau$ = D/v) required for the sound wave to travel past the light beam, causing the deflection speed to be lowered.

To increase the deflection point number without sacrificing the deflection speed, it is necessary to expand the bandwidth of the deflector. Commonly, this bandwidth is given approximately as $$\Delta f \approx 1.8 n v^2 \cos \theta_o / f_o \lambda_o L \quad (3)$$

where $n$ denotes the refractive index of a deflection medium used, L a length for which a sound wave acts on a light beam, $f_o$ a center frequency, $\theta_o$ a Bragg angle at the center frequency $f_o$, and $\lambda_o$ a light wavelength in the air. The bandwidth of the deflector is limited due to the fact that it deviates from the Bragg angle with changes in the frequency of the sound wave because the light beam incident angle is fixed. In a PbMoO$_4$ crystal, for example, the bandwidth $\Delta f$ calculated from Eq. (3) is 65 MHz when a longitudinal wave propagating along the axis c is used. This theoretical value of bandwidth is about the same as experimentally measured results. This bandwidth, however, is not wide enough for the purpose of realizing a greater deflection point number at a high deflection speed.

A diffraction phenomenon in an optically anistropic deflection medium is called the anisotropic Bragg diffraction phenomenon, as opposed to the common Bragg diffraction phenomenon. It is known that the use of the anisotropic Bragg diffraction phenomenon makes it possible to realize a light deflector operable over a wide band. The principle of this approach is understood as follows. When a polarization direction of a light beam diffracted by a sound wave intersects perpendicular with a polarization direction of an incident light beam, and refractive indices are different at these polarization directions, the wave vectors of the incident light wave, the diffracted light wave and the sound wave match each other without necessarily forming them into a isosceles triangle as in an isotropic body. Accordingly, the Bragg angle $\theta_i$ of the incident light beam and the output beam angle $\theta_d$ can be plotted qualitatively as shown in FIG. 4. In other words, changing the frequency will bring about a small change in the Bragg angle of incident light and a large change in the diffraction angle. This signifies the fact that the Bragg condition is satisfied over a wide sound wave frequency range. Thus, if a deflector is designed so that the frequency $f_d$ at which the change in the incident angle $\theta_i$ with change in the frequency becomes zero is equal to the center frequency, this deflector can be operated over a wide frequency range. The frequency $f_d$ is fairly high (about 1 GHz) in a common anisotropic crystal, e.g., quartz crystal, or higher than 1 GHz in a PdMoO$_4$ crystal. It is virtually impossible for the presently available techniques to oscillate such a high frequency sound wave efficiently. In a TeO$_2$ crystal whose useful acoustooptic properties have recently been proved, the frequency $f_d$ is as low as several tens megahertz but, on the other hand, the sound propagation speed which is concerned in the anisotropic Bragg diffraction is as low as 616 m/s, or the deflection speed is very low. It is apparent that such light deflector is not suited for use with a data processing system using optical means which must be operated at high deflection speed.

To solve the foregoing problems, the invention provides a ultrasonic light deflector as its third embodiment, which can be operated at high speed and makes many deflection points available.

The center frequency $f_d$ of a wide band light deflector using the foregoing anisotropic Bragg diffraction phenomenon is given as $$fd = v \sqrt{|n_i^2 - n_d^2|} / \lambda_o \approx v \sqrt{2 n_i \Delta n} / \lambda_o \quad (4)$$

where $n_i$ denotes a refractive index for an incident light beam with wavelength $\lambda_o$, $n_d$ a refractive index for a diffracted output light beam with a polarization plane normal to the incident light beam, and $\Delta n$ the difference between $n_i$ and $n_d$. As indicated in Eq. (4), the value $n_i |\Delta n|$ of the refractive index of a deflector must be small enough if the frequency $f_d$ is desired to be lower than that in a quartz crystal or a PdMoO$_4$ crystal, and the deflection speed to be higher than that in a TeO$_2$ crystal. According to the invention, a PbO·xNb$_2$O$_5$ crystal is used as the deflection medium to realize an efficient ultrasonic light deflector. This crystal exhibits unique refractive index dispersion characteristics. More specifically, with the light transmission direction determined suitably, the difference between refractive indices for two linear polarized light beams intersecting normal to each other, i.e, $\Delta n$ in Eq. (4), is $10^{-3}$ to $10^{-4}$ being one- to two-order smaller than that available with a common anisotropic crystal. Furthermore, the sound wave propagation speed which is concerned in the diffraction phenomenon is about 3000 m/s or about 5 times faster than that available with a TeO$_2$ crystal. This makes it possible to realize an ultrasonic light deflector having a wide band with a readily feasible center frequency of about 200 MHz and yet operable at high deflection speed.

The third embodiment of the invention using a PbO·xNb$_2$O$_5$ ($x = 1.9$ in this example) will be described by referring to FIG. 5. A piezoelectric shear wave transducer 52 for thickness shear oscillation is bonded to a plane 1c of a PbO·1.9Nb$_2$O$_5$ crystal 51 which has been formed into a polished parallelepiped along crystal axes a, b and c. A high frequency field from a high frequency oscillator 53 is applied across the piezoelectric transducer 52 whereby a shear sound wave (not shown) displaced along the axis a is generated in the deflection medium 51. The piezoelectric shear wave transducer 52 is, for example, of the known LiNbO$_3$ X-cut 163° rotation Y-cut plate. Similar to the arrangement shown in FIG. 2, a sound absorber 54 is installed so that a sound wave generated in the deflection medium 51 becomes a travelling wave. An input light beam 55 is applied to the PbO·1.9Nb$_2$O$_5$ crystal, i.e., the deflection medium 51 through its plane 1b. The light beam 55 is prearranged to be of linear polarized light with its polarization direction along the axis a or c of the crystal 51. The input light beam 55 is diffracted by the sound wave into a diffracted output beam 56 and a nondiffracted output beam 57. The sound wave generated in the medium 51 by the piezoelectric transducer 52 is a shear wave displaced along the axis a and hence the polarization direction of the light beam diffracted through a photoelastic constant p$_{55}$ orthogonally intersects that of the input light beam 55. The PbO·1.9Nb$_2$O$_5$ crystal exhibits unique wavelength vs. refractive index dispersion characteristics as shown in FIG. 6 or described in Journal of The Physical Society of Japan, Vol. 36, p. 1266. Specifically, the PbO·1.9Nb$_2$O$_5$ crystal is of biaxial crystal functioning as a uniaxial crystal when an input light beam of specific wavelength is applied. Assume that the input light wavelength is 589 nm. Then $n_a \neq n_c$ where the foregoing anisotropic Bragg diffraction phenomenon occurs, permitting the light deflector to operate over a wide band if the sound wave frequency is adequate. In this crystal, the velocity of the plane shear sound wave displaced in the direction of axis a and propagated in the direction of axis c is 2900 m/s, and the refractive index difference between $n_a$ and $n_c$ is 0.4 × $10^{-3}$ when the input light wavelength is 589 nm. Therefore the center frequency $f_d$ is 216 MHz in this crystal, being far lower than that in a quartz crystal or in a $PdMoO_4$ crystal. At such low center frequency, a sound wave can be efficiently generated in the crystal and thus an ultrasonic light deflector operable over a wide band is realized. Furthermore, the sound velocity concerned in the diffraction phenomenon is 2900 m/s in the crystal of the invention, which is about 5 times higher than that in a $TeO_2$ crystal. In other words, the ultrasonic light deflector of the invention can be operated at a deflection speed about 5 times higher than that available with the conventional ultrasonic light deflector using a $TeO_2$ crystal. In the third embodiment, a shear wave propagated along the axis c is used for the sake of illustration. Instead, a piezoelectric shear wave transducer is installed on the plane a of the crystal unlike one shown in FIG. 5, wherein a shear wave may be propagated along the axis a and displaced along the axis c. Or instead, a shear wave may be propagated in an arbitrary direction in a plane formed by the axes $a$ and $c$ and displaced in the direction normal to the wave propagating direction and to the axis $b$. Any crystal belonging to the group of $PbO \cdot xNb_2O_5$ where $x$ lies between 1.5 and 2.1, i.e., $1.5 \leq x < 2.1$, exhibits refractive index dispersion characteristics as shown in FIG. 6 and can be used as in the third embodiment. FIG. 7 shows refractive index dispersion characteristics of a $PbO \cdot 2.1Nb_2O_5$ crystal which belongs to the other crystal group where $x$ lies between 2.1 and 3.1, i.e., $2.1 \leq x \leq 3.1$ This crystal is a biaxial crystal where $n_a$ is close to $n_b$. With the use of this crystal, an ultrasonic light deflector operable over a wide band can also be realized. The center frequency $f_d$ is 187 MHz when the $PbO \cdot 2.1Nb_2O_5$ crystal is used with a light beam 589 nm in wavelength applied. This frequency is readily applicable to practical wide band light deflectors of the type described above. At this frequency, the axes $b$ and $c$ should be replaced with each other in the arrangement shown in FIG. 5.

The invention has been described in its embodiments in connection with ultrasonic light deflectors and surface wave light deflectors. It is apparent that other acoustooptic devices such as light modulator and light filter can readily be constituted according to the principles of the invention disclosed hereinbefore. In the foregoing embodiments, $PbO \cdot xNb_2O_5$ crystals ($x = 2.7, 2.1$ and $1.9$) are used for illustrating the invention. Other $PbO \cdot xNb_2O_5$ crystals may be used for the purpose of the invention as long as $x$ lies between 1.5 and 3.1 (i.e., $1.5 \leq x \leq 3.1$). The reason why the composition ratio x is determined as $1.5 \leq x \leq 3.1$ is because $PbO \cdot Nb_2O_5$ crystals of high quality can hardly be obtained by the foregoing crystal growth techniques if the composition ratio x is out of the specified range. If $1 \leq x < 1.5$, for example, the crystal cracks into small pieces by cleavage during cooling after crystal growth. If $x < 3.1$, the crystal formed has a crystal lattice totally different from that of the crystal used for the invention.

According to the invention, as has been described, a $PbO \cdot xNb_2O_5$ crystal ($1.5 \leq x \leq 3.1$) is used as an acoustooptic medium and thus a highly efficient acoustooptic device is realized.

While several preferred embodiments of the invention and specific modifications thereof have been described, it is to be understood that various changes and modifications may occur to those skilled in the art without departing from the true spirit of the invention.

What is claimed is:

1. In an acoustooptic device, an acoustooptic medium consisting essentially of a single crystal of $PbO \cdot xNb_2O_5$ in which the mol composition of $Nb_2O_5$ in said crystal is $1.5 \leq x \leq 3.1$.

2. The acoustooptic device as in claim 1, wherein said single crystal is characterized by crystallographic axes a, b and c, wherein said crystal is in the form of a parallelepiped with the planes thereof disposed along said axes, and wherein said crystal has a sound wave oscillating means and a sound absorber, respectively, disposed opposite each other on opposite planes of said parallelepiped.

3. The acoustooptic device as in claim 2, wherein said sound wave oscillating means is a piezoelectric longitudinal wave transducer.

4. The acoustooptic device as in claim 2, wherein said sound wave oscillating means is a piezoelectric shear wave transducer.

5. The acoustooptic device as in claim 1, wherein said acoustooptic single crystal is in the form of a thin film plate integrally attached to a substrate, thereby forming a light waveguide, and wherein said thin film plate has coupled to the top surface thereof an elastic surface wave oscillating means.

6. The acoustic device as in claim 5, wherein said elastic surface oscillating means is a vapor deposited interdigital electrode.

7. The acoustooptic device as in claim 5, wherein said substrate is a glass plate having a refractive index smaller than that of the single crystal.

8. An acoustooptic device comprising an acoustooptic medium consisting essentially of a single crystal of $PbO \cdot xNb_2O_5$ ($1.5 \leq x \leq 3.1$) having crystallographic axes $a$, $b$ and $c$, means for propagating a longitudinal sound wave along axis $c$ or $a$ of said single crystal and means for transmitting a linearly polarized light beam along the axis $b$ or $a$.

9. The acoustooptic device as in claim 8, wherein said crystal is in the form of a parallelpiped with the planes thereof disposed along said axes and wherein said crystal has a longitudinal sound wave oscillating means and a sound absorber, respectively, disposed opposite planes of said parallelpiped.

10. The acoustooptic device as in claim 9, wherein said longitudinal sound wave oscillating means is a piezoelectric longitudinal wave transducer.

11. In an acoustooptic device, an acoustooptic medium consisting essentially of a single crystal of $PbO \cdot xNb_2O_5$ ($1.5 \leq x < 2.1$) having crystallographic axes $a$, $b$ and $c$, means for propagating a sound shear wave displaced along the axis $a$ or $c$ along the axis $c$ or $a$ and means for transmitting a linearly polarized light beam oscillated in the direction of axis $a$ or $c$ along the axis $b$ of said single crystal.

12. In an acoustooptic device, an acoustooptic medium consisting essentially of a single crystal of $PbO \cdot xNb_2O_5$ ($2.1 \leq x \leq 3.1$) having crystallographic axes $a$, $b$ and $c$, and including means for propagating a sound shear wave displaced along the axis $b$ or $a$ along the axis $a$ or $b$ of said single crystal and means for transmitting a linearly polarized light beam oscillated in the direction of axis $a$ or $b$ along the axis of said single crystal.

* * * * *